Dec. 23, 1924.

W. W. FEIKER

ARTIFICIAL FISH BAIT

Filed Oct. 15, 1921

1,520,636

W.W. Feiker
INVENTOR

BY Victor J. Evans
ATTORNEY

Patented Dec. 23, 1924.

1,520,636

UNITED STATES PATENT OFFICE.

WINFIELD W. FEIKER, OF RACINE, WISCONSIN.

ARTIFICIAL FISH BAIT.

Application filed October 15, 1921. Serial No. 507,836.

*To all whom it may concern:*

Be it known that I, WINFIELD W. FEIKER, a citizen of the United States, residing at Racine, in the county of Racine and State of Wisconsin, have invented new and useful Improvements in Artificial Fish Baits, of which the following is a specification.

This invention relates to an artificial minnow or fish lure and an object of the invention is to provide an artificial fish bait which will simulate life or the movements of a live minnow as it is drawn through the water.

A further object of this invention is to provide an artificial fish bait or lure as specified in which the head structure thereof is designed to provide a plurality of polygonal surfaces disposed at angles to each other, certain of which are arranged to provide a mouth or maw at the apex of which the fish line is to be attached the said polygonal faces being designed to diminish the superfluous water resistance and give motion to the bait as it is drawn through the water.

Other objects of the invention will appear in the following description taken in connection with the drawings wherein.

Referring more particularly to the drawings, the improved artificial bait or lure comprises a body 1 which is constructed of wood or suitable material and has a plurality of eyes 2 carried thereby to which hooks 3 of the usual type employed in artificial fish bait are attached. The body 1 is substantially oval in shape rearwardly of its head 5 as per the approved construction of the major portions of the bodies of artificial fish bait or lures.

The head 5 is designed to diminish superfluous water resistance and to cause movement of the artificial bait when, drawn through the water, similar to those of a live minnow or fish for the purpose of luring or attracting game fish.

Figure 1:
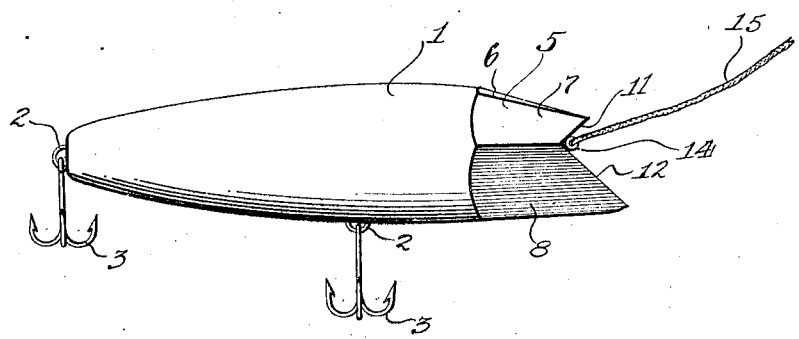
Fig. 1 is a side elevation of the improved artificial bait or lure.
Figure 2:
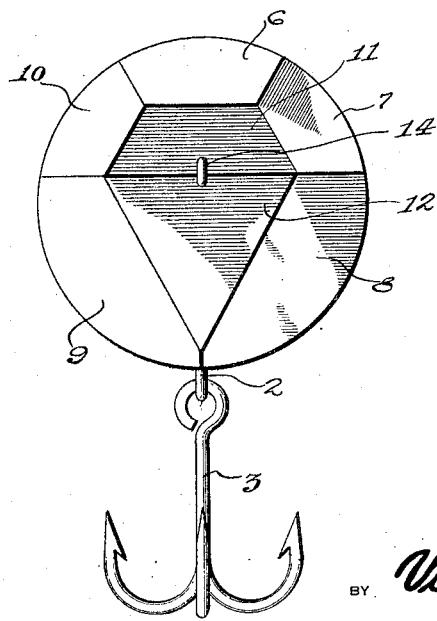
Figure 2 is an enlarged front end view of the fish bait or lure.

The head 5 is shaped to provide a plurality of polygonal portions 6, 7, 8, 9 and 10 which taper towards the axis of the body 1 and towards its forward end, decreasing in width towards their forward ends as clearly shown in Figs. 1 and 2 of the drawings. The forward end of the body 1 is cut to provide two inclined sides 11 and 12. The side 11 having four edges while the side 12 has three as clearly shown in Fig. 2 of the drawings. These surfaces 11 and 12 incline inwardly towards the axis of the body 1 providing a mouth or maw at the forward end, at the apex of which an eye 14 is mounted to which the fishing line 15 is connected. The side or surface 12 which forms the lower side of the mouth is longer than the upper side 11 as clearly shown in Fig. 1 and it, together with the arrangement of the faces 6, 7, 8, 9 and 10 as well as the surface 11 co-operate to cause a "wriggling" or "wabbling" movement to the body 1 as it is drawn through the water and for also diminishing the water resistance against the bait, and also provide a great amount of water resistance to be collected in the mouth to produce the proper motion to the bait for closely resembling the motion of a natural live fish. The polygonal faces 6, 7, 8, 9 and 10 also balance the bait as it is drawn through the water.

It is, of course, to be understood that the invention may be constructed in various other manners, and the parts associated in different relations, and therefore, I do not desire to be limited in any manner except as set forth in the claims hereunto appended.

Having thus described my invention what I claim is:

1. In an artificial fish bait or lure, a body, having its major portion circular in cross section, a plurality of hooks carried by said body, the forward end of said body being provided with a plurality of flat polygonal faces disposed at obtuse angles one to the other, said forward end being cut to provide a pair of inclining surfaces inclined rearwardly and inwardly towards the required location in the body and forming a mouth, and a line attaching eye at the apex of said mouth.

2. In an artificial bait or lure, a body having its major portion circular in cross section, a plurality of hooks carried by said body, the forward end of said body being provided with a plurality of flat polygonal faces disposed at obtuse angles one to the other, said forward end being cut to provide a pair of inclining surfaces inclined rearwardly and inwardly and towards the required location in the body and forming a mouth, and a line attaching eye at the apex of said mouth, the lower of said inclining surfaces being longer and projecting forwardly beyond the upper of the inclined surface.

3. An artificial fish lure comprising a body circular in cross section and having its front end cut to form a plurality of flat polygonal faces disposed at obtuse angles to each other, and inclining forwardly towards the axis of the body, the lowermost flat surfaces being larger than any of the other flat surfaces and meeting at the longitudinal center of the body.

4. An artificial fish lure comprising a body circular in cross section and having its front end cut to form a plurality of flat polygonal faces disposed at obtuse angles to each other, the lower pair of said flat surfaces being equal in size and being larger than and projecting forwardly of the upper flat surfaces.

5. An artificial fish lure comprising a body circular in cross section and having its front end cut to form a plurality of flat polygonal faces disposed at obtuse angles to each other, the lower pair of said flat surfaces being equal in size and being larger than and projecting forwardly of the upper surfaces, the forward end of said body being cut to provide a pair of inclining surfaces inclining inwardly towards the required location in the body and forming a mouth.

In testimony whereof I affix my signature.

WINFIELD W. FEIKER.